United States Patent
Xu et al.

(10) Patent No.: US 9,176,799 B2
(45) Date of Patent: Nov. 3, 2015

(54) HOP-BY-HOP ERROR DETECTION IN A SERVER SYSTEM

(71) Applicant: Advanced Micro Devices, Inc., Sunnyvale, CA (US)

(72) Inventors: Min Xu, Palo Alto, CA (US); Sean Lie, Los Gatos, CA (US); Gene Shen, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 214 days.

(21) Appl. No.: 13/731,189

(22) Filed: Dec. 31, 2012

(65) Prior Publication Data

US 2014/0189443 A1    Jul. 3, 2014

(51) Int. Cl.

| | |
|---|---|
| G06F 11/00 | (2006.01) |
| G06F 11/07 | (2006.01) |
| G06F 11/08 | (2006.01) |
| H04L 12/801 | (2013.01) |
| H04L 1/00 | (2006.01) |
| G06F 11/10 | (2006.01) |
| H04L 12/26 | (2006.01) |

(52) U.S. Cl.
CPC .......... *G06F 11/0724* (2013.01); *G06F 11/079* (2013.01); *G06F 11/08* (2013.01); *G06F 11/1004* (2013.01); *H04L 1/00* (2013.01); *H04L 1/0061* (2013.01); *H04L 43/065* (2013.01); *H04L 43/0823* (2013.01); *H04L 47/10* (2013.01); *H04L 2001/0097* (2013.01)

(58) Field of Classification Search
CPC ............ G06F 11/0766; G06F 11/0772; G06F 11/0793; G06F 11/2028; G06F 11/0709; G06F 11/0781; H04L 29/14; H04L 12/2422

USPC ..................................................... 714/4.1, 48
See application file for complete search history.

(56) References Cited

U.S. PATENT DOCUMENTS

| | | | |
|---|---|---|---|
| 6,952,419 B1 * | 10/2005 | Cassiday et al. | 370/392 |
| 7,644,317 B1 * | 1/2010 | Sajassi et al. | 714/43 |
| 7,925,802 B2 | 4/2011 | Lauterbach et al. | |
| 8,140,719 B2 | 3/2012 | Lauterbach et al. | |
| 2003/0154285 A1 * | 8/2003 | Berglund et al. | 709/227 |
| 2004/0225927 A1 * | 11/2004 | Warpenburg et al. | 714/47 |
| 2005/0076113 A1 * | 4/2005 | Klotz et al. | 709/224 |
| 2006/0126495 A1 * | 6/2006 | Guichard et al. | 370/216 |
| 2008/0107116 A1 * | 5/2008 | Godiwala et al. | 370/394 |
| 2008/0140817 A1 * | 6/2008 | Agarwal et al. | 709/223 |
| 2011/0270981 A1 * | 11/2011 | Stein et al. | 709/224 |
| 2013/0019180 A1 * | 1/2013 | Kimbuende et al. | 715/736 |

OTHER PUBLICATIONS

Dictionary definition of "FLITs", retrieved from http://en.wikipedia.org/wiki/FLITs.*

* cited by examiner

*Primary Examiner* — Yair Leibovich

(57) ABSTRACT

A server system performs error detection on a hop-by-hop basis at multiple compute nodes, thereby facilitating the detection of a compute node experiencing failure. The server system communicates a packet from an originating node (the originating node) to a destination node by separating the packet into multiple flow control digits (flits) and routing the flits using a series of hops over a set of intermediate nodes. The packet's final flit includes error detection information, such as checksum data. As each intermediate node receives the final flit, it performs error detection using the error detection information. The pattern of nodes that detect an error indicates which intermediate node has experienced a failure.

10 Claims, 8 Drawing Sheets

HOP-BY-HOP ERROR DETECTION IN A SERVER SYSTEM

BACKGROUND

1. Field of the Disclosure

The present disclosure relates generally to processing systems and more particularly to error checking in server systems.

2. Description of the Related Art

High performance computing systems, such as server systems, are sometimes implemented using compute nodes connected together by one or more fabric interconnects. The compute nodes execute software programs to perform designated services, such as file management, database management, document printing management, web page storage and presentation, computer game services, and the like, or a combination thereof. The multiple compute nodes facilitate the processing of relatively large amounts of data while also facilitating straightforward build-up and scaling of the computing system. During operation, the compute nodes communicate with each other by routing information over multiple nodes, whereby each compute node routes received information to one of its connected nodes according to a defined routing plan. A failure at a compute node can cause faulty communication of information to its connected nodes, thereby causing errors at the server system. However, because the information is routed over multiple nodes, it can be difficult to identify the particular compute node in the routing path that experienced the failure.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENTS

FIGS. 1-9 illustrate example techniques for performing error detection on a hop-by-hop basis at a server system having multiple compute nodes, thereby facilitating the detection of a compute node experiencing failure. To illustrate, in the server system each compute node can communicate data to the nodes to which it is connected, wherein communication of data to a connected node is referred to as "hop". The server system communicates a packet from an originating compute node (the originating node) to a destination compute node (the destination node) by separating the packet into multiple flow control digits (flits) and routing the flits using a series of hops over a set of compute nodes (the intermediate nodes) between the originating node and the destination node. The packet's final flit includes error detection information, such as checksum data. As each intermediate node receives the final flit, it performs error detection using the error detection information and, in response to detecting an error, sets a flag associated with the corresponding intermediate node. The set of flags corresponding to the intermediate nodes thereby form a pattern that indicates which if any of the intermediate nodes has experienced a failure. In particular, a flag set for a given intermediate node indicates a failure at the immediately preceding intermediate node in the routing path. The failing intermediate node is thus readily identifiable, reducing the cost and complexity in locating and repairing faulty compute nodes.

For ease of illustration, these techniques are described in the example context of a cluster compute server as described below with reference to FIGS. 1-6. Examples of such systems include servers in the SM10000 series or the SM15000 series of servers available from the SeaMicro™ division of Advanced Micro Devices, Inc. Although a general description is described below, additional details regarding embodiments of the cluster compute server are found in U.S. Pat. Nos. 7,925,802 and 8,140,719, the entireties of which are incorporated by reference herein. The techniques described herein are not limited to this example context, but instead may be implemented in any of a variety of processing systems or network systems.

Figure 1:
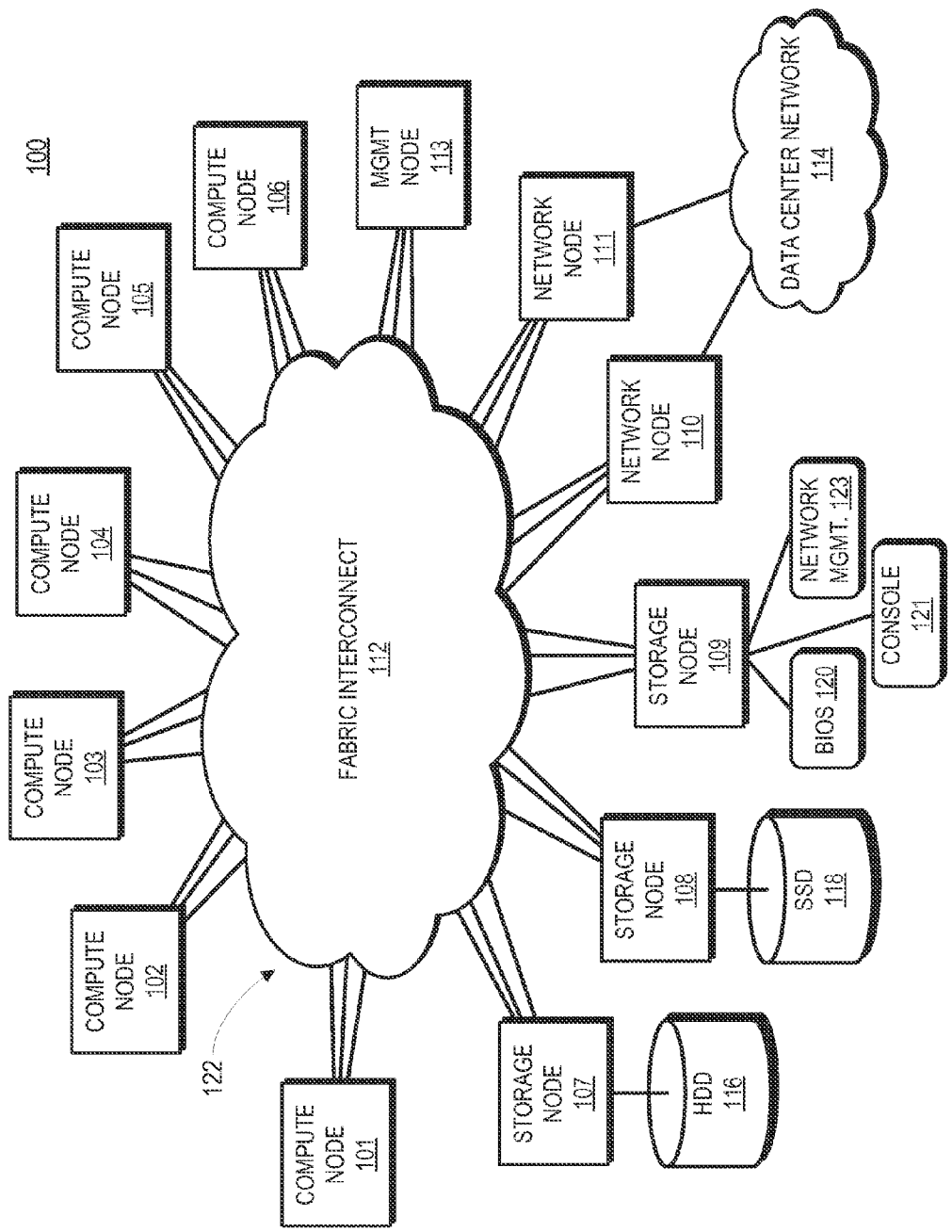
FIG. 1 is a block diagram of a cluster compute server in accordance with some embodiments.

FIG. 1 illustrates a cluster compute server 100 in accordance with some embodiments. The cluster compute server 100, referred to herein as "server 100", comprises a data center platform that brings together, in a rack unit (RU) system, computation, storage, switching, and server management. The server 100 is based on a parallel array of independent low power compute nodes (e.g., compute nodes 101-106), storage nodes (e.g., storage nodes 107-109), network nodes (e.g., network nodes 110 and 111), and management nodes (e.g., management node 113) linked together by a fabric interconnect 112, which comprises a high-bandwidth, low-latency supercomputer interconnect. Each node is implemented as a separate field replaceable unit (FRU) comprising components disposed at a printed circuit board (PCB)-based card or blade so as to facilitate efficient build-up, scaling, maintenance, repair, and hot swap capabilities.

The compute nodes operate to execute various software programs, including operating systems (OSs), hypervisors, virtualization software, compute applications, and the like. As with conventional server nodes, the compute nodes of the server 100 include one or more processors and system memory to store instructions and data for use by the one or more processors. However, unlike conventional server nodes, in some embodiments the compute nodes do not individually incorporate various local peripherals, such as storage, I/O control, and network interface cards (NICs). Rather, remote peripheral resources of the server 100 are shared among the compute nodes, thereby allowing many of the components typically found on a server motherboard, such as I/O controllers and NICs, to be eliminated from the compute nodes and leaving primarily the one or more processors and the system memory, in addition to a fabric interface device.

The fabric interface device, which may be implemented as, for example, an application-specific integrated circuit (ASIC), operates to virtualize the remote shared peripheral resources of the server 100 such that these remote peripheral resources appear to the OS executing at each processor to be located on corresponding processor's local peripheral bus. These virtualized peripheral resources can include, but are not limited to, mass storage devices, consoles, Ethernet NICs, Fiber Channel NICs, Infiniband™ NICs, storage host bus adapters (HBAs), basic input/output system (BIOS), Universal Serial Bus (USB) devices, Firewire™ devices, PCIe devices, user interface devices (e.g., video, keyboard, and mouse), and the like. This virtualization and sharing of remote peripheral resources in hardware renders the virtualization of the remote peripheral resources transparent to the OS and other local software at the compute nodes. Moreover, this virtualization and sharing of remote peripheral resources via the fabric interface device permits use of the fabric interface device in place of a number of components typically found on the server motherboard. This reduces the number of components implemented at each compute node, which in turn enables the compute nodes to have a smaller form factor while consuming less energy than conventional server blades which implement separate and individual peripheral resources.

The storage nodes and the network nodes (collectively referred to as "peripheral resource nodes") implement a peripheral device controller that manages one or more shared peripheral resources. This controller coordinates with the fabric interface devices of the compute nodes to virtualize and share the peripheral resources managed by the resource manager. To illustrate, the storage node 107 manages a hard disc drive (HDD) 116 and the storage node 108 manages a solid state drive (SSD) 118. In some embodiments, any internal mass storage device can mount any processor. Further, mass storage devices may be logically separated into slices, or "virtual disks", each of which may be allocated to a single compute node, or, if used in a read-only mode, shared by multiple compute nodes as a large shared data cache. The sharing of a virtual disk enables users to store or update common data, such as operating systems, application software, and cached data, once for the entire server 100. As another example of the shared peripheral resources managed by the peripheral resource nodes, the storage node 109 manages a remote BIOS 120, a console/universal asynchronous receiver-transmitter (UART) 121, and a data center management network 123. The network nodes 110 and 111 each manage one or more Ethernet uplinks connected to a data center network 114. The Ethernet uplinks are analogous to the uplink ports of a top-of rack switch and can be configured to connect directly to, for example, an end-of-row switch or core switch of the data center network 114. The remote BIOS 120 can be virtualized in the same manner as mass storage devices, NICs and other peripheral resources so as to operate as the local BIOS for some or all of the nodes of the server, thereby permitting such nodes to forgo implementation of a local BIOS at each node.

The fabric interface device of the compute nodes, the fabric interfaces of the peripheral resource nodes, and the fabric interconnect 112 together operate as a fabric 122 connecting the computing resources of the compute nodes with the peripheral resources of the peripheral resource nodes. To this end, the fabric 122 implements a distributed switching facility whereby each of the fabric interfaces and fabric interface devices comprises multiple ports connected to bidirectional links of the fabric interconnect 112 and operate as link layer switches to route packet traffic among the ports in accordance with deterministic routing logic implemented at the nodes of the server 100. Note that the term "link layer" generally refers to the data link layer, or layer 2, of the Open System Interconnection (OSI) model.

The fabric interconnect 112 can include a fixed or flexible interconnect such as a backplane, a printed wiring board, a motherboard, cabling or other flexible wiring, or a combination thereof. Moreover, the fabric interconnect 112 can include electrical signaling, photonic signaling, or a combination thereof. In some embodiments, the links of the fabric interconnect 112 comprise high-speed bi-directional serial links implemented in accordance with one or more of a Peripheral Component Interconnect—Express (PCIE) standard, a Rapid IO standard, a Rocket IO standard, a Hyper-Transport standard, a FiberChannel standard, an Ethernet-based standard, such as a Gigabit Ethernet (GbE) Attachment Unit Interface (XAUI) standard, and the like.

Although the FRUs implementing the nodes typically are physically arranged in one or more rows in a server box as described below with reference to FIG. 3, the fabric 122 can logically arrange the nodes in any of a variety of mesh topologies or other network topologies, such as a torus, a multi-dimensional torus (also referred to as a k-ary n-cube), a tree, a fat tree, and the like. For purposes of illustration, the server 100 is described herein in the context of a multi-dimensional torus network topology. However, the described techniques may be similarly applied in other network topologies using the guidelines provided herein.

Figure 2:
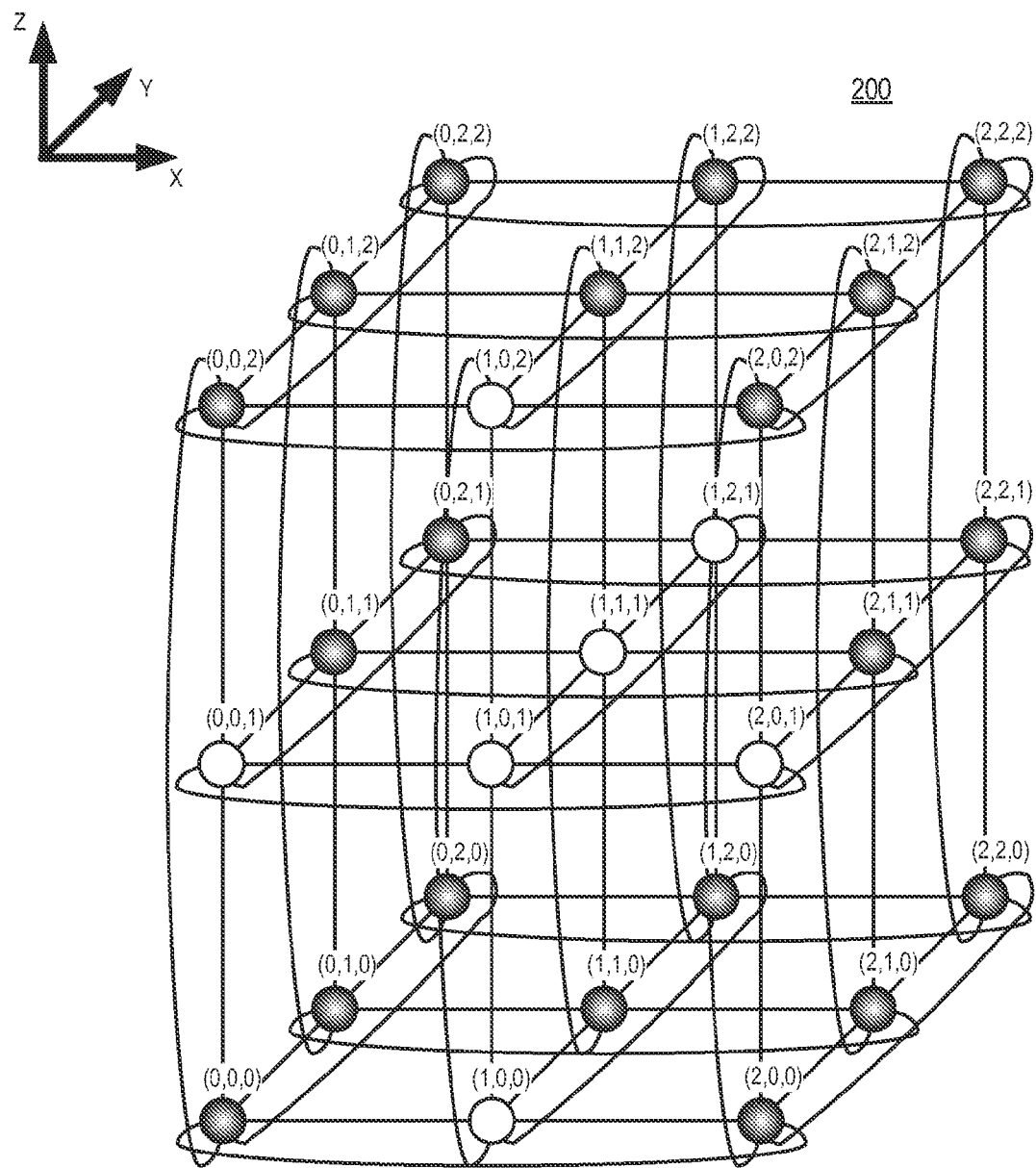
FIG. 2 is a diagram illustrating a configuration of the server of FIG. 1 in accordance with some embodiments.

FIG. 2 illustrates an example configuration of the server 100 in a network topology arranged as a k-ary n-cube, or multi-dimensional torus, in accordance with some embodiments. In the depicted example, the server 100 implements a three-dimensional (3D) torus network topology (referred to herein as "torus network 200") with a depth of three (that is, $k=n=3$). Accordingly, the server 100 implements a total of twenty-seven nodes arranged in a network of rings formed in three orthogonal dimensions (X,Y,Z), and each node is a member of three different rings, one in each of the dimensions. Each node is connected to six neighboring nodes via bidirectional serial links of the fabric interconnect 112 (see FIG. 1). The relative position of each node in the torus network 200 is identified in FIG. 2 by the tuple (x,y,z), where x, y, and z represent the position of the processing node in the X, Y, and Z dimensions, respectively. As such, the tuple (x,y,z) of a node also may serve as its address within the torus network 200, and thus its address in the server 100. In some embodiments, each node is assigned a media access control (MAC) address reflective of its position tuple (x,y,z), which allows the position of the node in the torus to be determined based on its MAC address.

It will be appreciated that the illustrated X, Y, and Z dimensions represent logical dimensions that describe the positions of each node in a network, but do not necessarily represent physical dimensions that indicate the physical placement of each node. For example, the 3D torus network topology for torus network 200 can be implemented via the wiring of the fabric interconnect 112 with the nodes in the network physically arranged in one or more rows on a backplane or in a rack. That is, the relative position of a given node in the torus network 200 is defined by nodes to which it is connected, rather than the physical location of the processing node. In some embodiments, the fabric 122 (see FIG. 1) comprises a plurality of sockets wired together via the fabric interconnect 112 so as to implement the 3D torus network topology, and each of the nodes comprises a field replaceable unit (FRU) configured to couple to the sockets used by the fabric interconnect 112, such that the position of the node in torus network 200 is dictated by the socket into which the node is inserted.

In the server 100, messages communicated between nodes are segmented into one or more packets, which are routed over a routing path between the source node and the destination node. The routing path may include zero, one, or more than one intermediate nodes. As noted above, each node includes an interface to the fabric interconnect 112 that implements a layer 2 switch to route packets among the ports of the node connected to corresponding links of the fabric interconnect 112. In some embodiments, these distributed switches operate to route packets over the supercomputer fabric 122 using a fixed routing scheme that employs strict deterministic dimensional order routing (that is, completely traversing the torus network 200 in one dimension before moving to another dimension) in order to avoid fabric deadlocks. Moreover, as there are multiple routes between nodes in the torus network 200, the supercomputer fabric 212 can be programmed for packet traffic to traverse a secondary path in case of a primary path failure. The fabric 212 also can implement packet classes and virtual channels to more effectively utilize the link bandwidth and eliminate packet loops, and thus avoid the need for link-level loop prevention and redundancy protocols such as the spanning tree protocol.

Various packet routing and techniques protocols may be implemented by the fabric 122. For example, to avoid the need for large buffers at switch of each node, the fabric 122 may use flow control digit ("flit")-based switching whereby each packet is segmented into a sequence of flits. The first flit, called the header flit, holds information about the packet's route (namely the destination address) and sets up the routing behavior for all subsequent flit associated with the packet. The header flit is followed by zero or more body flits, containing the actual payload of data. The final flit, called the tail flit, performs some book keeping to release allocated resources on the source and destination nodes, as well as all the intermediate nodes. These flits then may be routed through the torus network 200 using cut-through routing, which allocates buffers and channel bandwidth on a packet level, or wormhole routing, which allocated buffers and channel bandwidth on a flit level. Wormhole routing has the advantage of enabling the use of virtual channels in the torus network 200. A virtual channel holds the state needed to coordinate the handling of the flits of a packet over a channel, which includes the output channel of the current node for the next hop of the route and the state of the virtual channel (e.g., idle, waiting for resources, or active). The virtual channel may also include pointers to the flits of the packet that are buffered on the current node and the number of flit buffers available on the next node.

Figure 3:
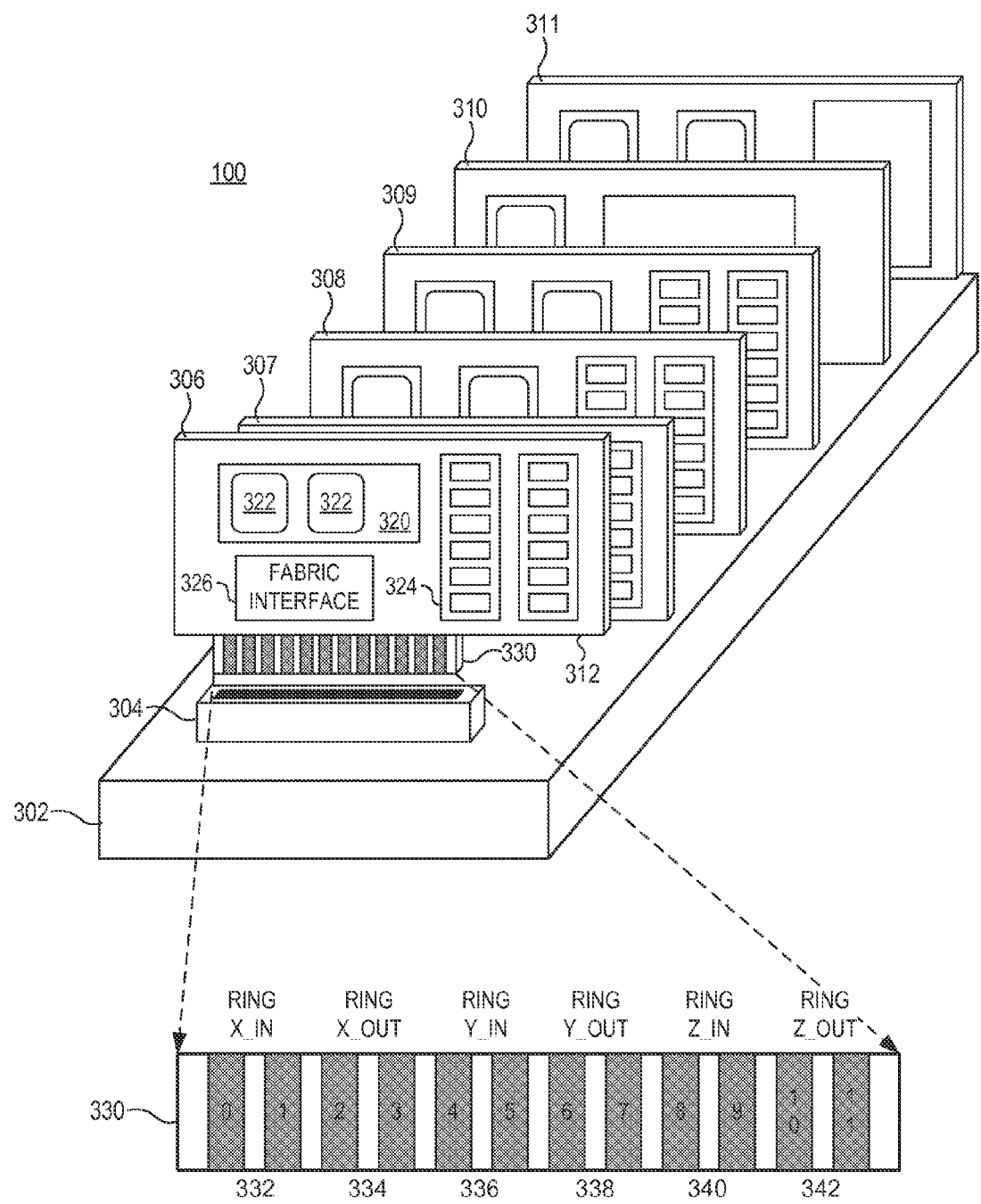
FIG. 3 illustrates an example physical arrangement of nodes of the server of FIG. 1 in accordance with some embodiments.

FIG. 3 illustrates an example physical arrangement of nodes of the server 100 in accordance with some embodiments. In the illustrated example, the fabric interconnect 112 includes one or more interconnects 302 having one or more rows or other aggregations of plug-in sockets 304. The interconnect 302 can include a fixed or flexible interconnect, such as a backplane, a printed wiring board, a motherboard, cabling or other flexible wiring, or a combination thereof. Moreover, the interconnect 302 can implement electrical signaling, a photonic signaling, or a combination thereof. Each plug-in socket 304 comprises a card-edge socket that operates to connect one or more field replaceable units (FRUs), such as FRUs 306-311, with the interconnect 302. Each FRU represents a corresponding node of the server 100. For example, FRUs 306-309 can comprise compute nodes, FRU 310 can comprise a network node, and FRU 311 can comprise a storage node.

Each FRU includes a PCB and components disposed thereon, whereby the components are interconnected via metal layers of the PCB and provide the functionality of the node represented by the FRU. For example, the FRU 306, being a compute node in this example, includes a PCB 312 implementing a processor 320 comprising one or more processor cores 322, one or more memory modules 324, such as DRAM dual inline memory modules (DIMMs), and a fabric interface device 326. Each FRU further includes a socket interface 330 that operates to connect the FRU to the interconnect 302 via the plug-in socket 304.

The interconnect 302 provides data communication paths between the plug-in sockets 304, such that the interconnect 302 operates to connect FRUs into rings and to connect the rings into a 2D- or 3D-torus network topology, such as the torus network 200 of FIG. 2. The FRUs take advantage of these data communication paths through their corresponding fabric interfaces, such as the fabric interface device 326 of the FRU 306. The socket interface 330 provides electrical contacts (e.g., card edge pins) that electrically connect to corresponding electrical contacts of plug-in socket 304 to act as port interfaces for an X-dimension ring (e.g., ring-X_IN port 332 for pins 0 and 1 and ring-X_OUT port 334 for pins 2 and 3), for a Y-dimension ring (e.g., ring-Y_IN port 336 for pins 4 and 5 and ring-Y_OUT port 338 for pins 6 and 7), and for an Z-dimension ring (e.g., ring-Z_IN port 340 for pins 8 and 9 and ring-Z_OUT port 342 for pins 10 and 11). In the illustrated embodiment, each port is a differential transmitter comprising either an input port or an output port of, for example, a PCIE lane. The skilled artisan will understand that a port can include additional TX/RX signal pins to accommodate additional lanes or additional ports.

Figure 4:
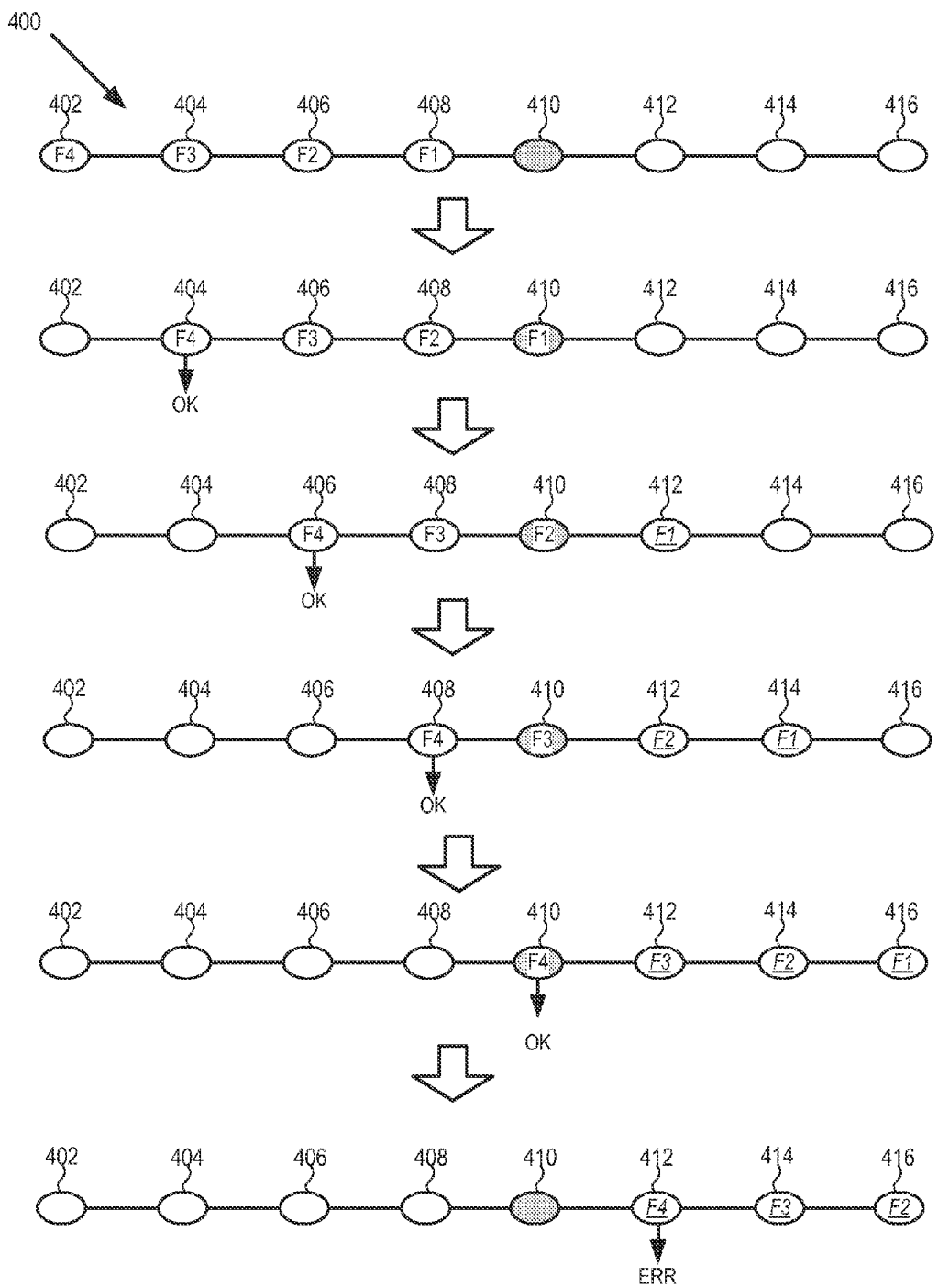
FIG. 4 illustrates performing error detection on a hop-by-hop basis at intermediate nodes of a routing path at the server of FIG. 1 in accordance with some embodiments.

Some types of equipment failure or other failure at a given compute node (referred to herein as a "faulty node") can result in communication errors between the faulty node and its connected compute nodes. However, because the server system 100 frequently routes packets over multiple nodes, it can be difficult to identify which compute node in a routing path is the faulty node. Further, in order to conserve buffer space the nodes employ wormhole routing, whereby each intermediate node does not store an entire packet for error checking. Conventionally, in response to an error being detected at a destination node of a given routing path, the faulty node has been identified by, replacing each intermediate node in the routing path one at a time and retesting the routing path until a successful test indicates that the faulty node has been replaced. This replacement technique is time-consuming and expensive. Accordingly, the server system 100 employs hop-by-hop error detection to identify faulty nodes. An example of this operation is shown in FIG. 4, which illustrates a set of flits being communicated over a routing path 400. Routing path 400 includes an originating node 402, intermediate nodes 404, 406, 408, 410, 412, and 414 (intermediate nodes 404-414) and a destination node 416. For purposes of the example of FIG. 4, intermediate node 410 is a faulty node, as indicated by the node including a gray fill.

In the illustrated example of FIG. 4, the routing path 400 is communicating a packet that the originating node 402 has separated into four flits, designated "F1", "F2", "F3", and "F4". F1 represents the first flit including the header information indicating the destination node 416 and F4 represents the final flit having the error detection information for the packet. For purposes of illustration, the error detection information is assumed to be checksum information. In addition, in the illustrated example the faulty intermediate node 410 introduces errors into each of the flits F1-F4. These errors can be introduced by, for example, hardware failures at the buffer that stores the flits, at the hardware that receives and stores the flits at the buffer, at the hardware that communicates the flits to intermediate node 412, and the like, or any combination thereof. A flit that includes an error is illustrated in italics and underlined.

The flits F1-F4 are communicated from the originating node 402 to the destination node 416 by individually communicating each flit, in order, along the intermediate nodes 404-414. For purposes of illustration, the flits F1-F4 are illustrated as distributed along the routing path 400, but it will be appreciated that the flits F1-F4 can be buffered at each intermediate node, such that multiple flits can be present at a given intermediate node at a given point of time. At the first time illustrated in FIG. 4, flit F1 is at intermediate node 408, flit F2 is at intermediate node 406. Flit F1 is at intermediate node 404, and flit F1 is at originating node 402. At the next illustrated time, each of the flits has moved to the next node along the routing path 400, such that flit F4 has reached intermediate node 404. As each flit passes through an intermediate node, the intermediate node incrementally adjusts a stored checksum or other error detection information for the packet based on the flit. Accordingly each intermediate node does not have to store the entire packet to perform error detection for the packet. In response to receiving the final flit for the packet having the generated checksum for the packet, the node completes the error detection by completing calculation of the checksum.

In the illustrated example, intermediate node 404 performs an error detection operation using the checksum information included in F4 and reports that no errors have been detected. As described further herein, in some embodiments an intermediate node can report the results of an error detection operation by storing a designated value at a local register of the intermediate node. In some embodiments, the intermediate node reports the results of the error detection operation by communicating the designated value to a compute node that has been assigned to manage error detection operations for the server 100.

As flit F4 arrives at each intermediate node along the routing path 400, the intermediate node completes the error detection operation and reports the result. Accordingly, because no errors are introduced by nodes 404-408, no errors are reported by intermediate nodes 406-410. However, because node 410 introduces an error, nodes 412 and 414 each report an error. In response to the flit F4 arriving at destination node 416, the node performs a final error detection operation and detects an error. In response, a compute node of the server 100 (either the destination node 416 or another compute node that has been assigned to manage error detection operations) analyzes the error reports from each of the intermediate nodes 404-412. In response to determining that intermediate node 410 was the last node in the routing path 400 that did not report an error, the compute node reports that intermediate node 410 has experienced a failure.

In some embodiments, node 410 may itself detect the error that resulted from its own failure. In such a scenario, the faulty node can be detected by first replacing the compute node previous to the first node in the routing path that first detected the error and then testing the path. Thus, in this example, node 410 is the node in the routing path that first detected the error, and node 408 is therefore replaced. If the test results in an error, it is assumed that the node in the routing path that detected the error (node 410 in this example) is faulty, and that node is replaced.

In response to the failure report, the server can take remedial action. For example, in some embodiments the server can update its routing schemes so that the faulty node is no longer used as an intermediate node. In some embodiments, the server redistributes any services assigned to execute at the faulty node to other nodes. In some embodiments, the server reports the faulty node, either to a local user or to a remote service center via a network. This report allows the FRU for the faulty node to be quickly and easily identified and replaced. In some embodiments, the server does not take remedial action until the faulty node has been reported as faulty a threshold number of times.

Figure 5:
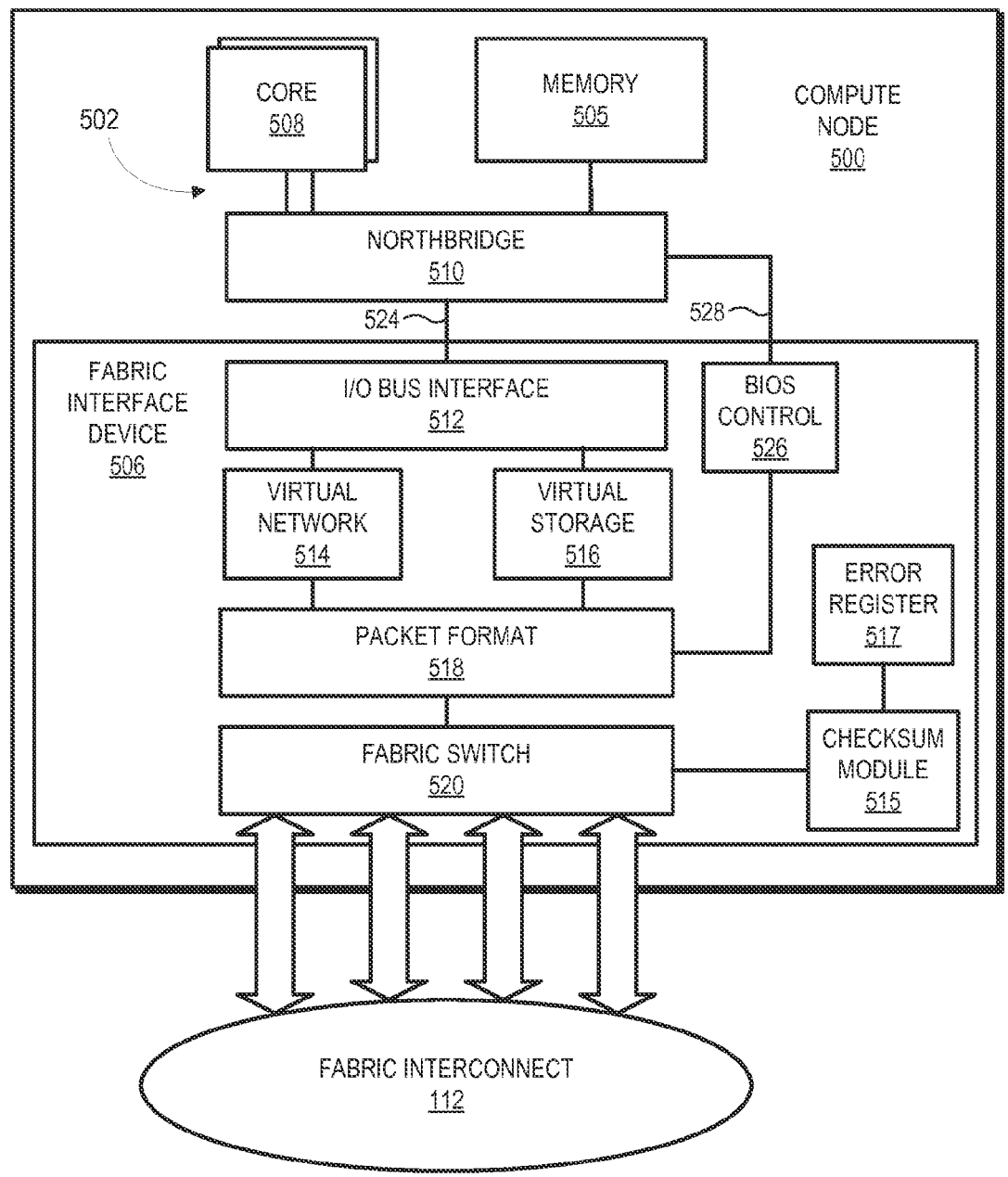
FIG. 5 illustrates a compute node implemented in the server of FIG. 1 in accordance with some embodiments.

FIG. 5 illustrates a compute node 500 implemented in the server 100 of FIG. 1 in accordance with some embodiments. The compute node 500 corresponds to, for example, one of the compute nodes 101-106 of FIG. 1. In the depicted example, the compute node 500 includes a processor 502, system memory 504, and a fabric interface device 506 (corresponding to the processor 320, system memory 324, and the fabric interface device 326, respectively, of FIG. 3). The processor 502 includes one or more processor cores 508 and a northbridge 510. The one or more processor cores 508 can include any of a variety of types of processor cores, or combination thereof, such as a central processing unit (CPU) core, a graphics processing unit (GPU) core, a digital signal processing unit (DSP) core, and the like, and may implement any of a variety of instruction set architectures, such as an x86 instruction set architecture or an Advanced RISC Machine (ARM) architecture. The system memory 504 can include one or more memory modules, such as DRAM modules, SRAM modules, flash memory, or a combination thereof. The northbridge 510 interconnects the one or more cores 408, the system memory 504, and the fabric interface device 506. The fabric interface device 506, in some embodiments, is implemented in an integrated circuit device, such as an application-specific integrated circuit (ASIC), a field-programmable gate array (FPGA), mask-programmable gate arrays, gate arrays, programmable logic, and the like.

In a conventional computing system, the northbridge 510 would be connected to a southbridge, which would then operate as the interface between the northbridge 510 (and thus the processor cores 208) and one or local more I/O controllers that manage local peripheral resources. However, as noted above, in some embodiments the compute node 500 does not maintain local peripheral resources or their I/O controllers, and instead uses shared remote peripheral resources at other nodes in the server 100. To render this arrangement transparent to software executing at the processor 502, the fabric interface device 506 virtualizes the remote peripheral resources allocated to the compute node such that the hardware of the fabric interface device 506 emulates a southbridge and thus appears to the northbridge 510 as a local southbridge connected to local peripheral resources.

To this end, the fabric interface device 506 includes an I/O bus interface 512, a virtual network controller 514, a virtual storage controller 516, a packet formatter 518, and a fabric switch 520. The I/O bus interface 512 connects to the northbridge 510 via a local I/O bus 524 and acts as a virtual endpoint for each local processor core 508 by intercepting requests addressed to virtualized peripheral resources that appear to be on the local I/O bus 524 and responding to the requests in the same manner as a local peripheral resource, although with a potentially longer delay due to the remote location of the peripheral resource being virtually represented by the I/O bus interface 512.

While the I/O bus interface 512 provides the physical interface to the northbridge 510, the higher-level responses are generated by the virtual network controller 514 and by the virtual storage controller 516. Requests sent over I/O bus 524 for a network peripheral, such as an Ethernet NIC, are routed by the I/O bus interface 512 to the virtual network controller 514, while storage requests are routed by the I/O bus interface 512 to the virtual storage controller 516. The virtual network controller 514 provides processing of incoming and outgoing requests based on, for example, an Ethernet protocol. The virtual storage controller provides processing of incoming and outgoing requests based on, for example, a serial ATA (SATA) protocol, a serial attached SCSI (SAS) protocol, a Universal Serial Bus (USB) protocol, and the like.

After being processed by either the virtual network controller 514 or the virtual storage controller 516, requests are forwarded to the packet formatter 518, which encapsulates the request into one or more packets. The packet formatter 518 then determines the address or other location identifier of the peripheral resource node managing the physical peripheral resource intended for the request. The packet formatter 518 adds the address to the headers of the one or more packets in which the request is encapsulated, and the fabric switch 520 then transmits the one or more packets to the next node in the routing path via the fabric interconnect 112.

As illustrated, the fabric switch 520 implements a plurality of ports, each port interfacing with a different link of the fabric interconnect 112. To illustrate using the 3×3 torus network 200 of FIG. 2, assume the compute node 500 represents the node at (1,1,1). In this example, the fabric switch 520 would have at least seven ports to couple it to seven bi-directional links: an internal link to the packet formatter 518; an external link to the node at (0,1,1); an external link to the node at (1,0,1), an external link to the node at (1,1,0), an external link to the node at (1,2,1), an external link to the node at (2,1,1), and an external link to the node at (1,1,2). Control of the switching of data among the ports of the fabric switch 520 is determined based on the deterministic routing logic.

For responses to outgoing requests and other incoming requests (e.g., requests from other compute nodes or from peripheral resource nodes), the process described above is reversed. The fabric switch 520 receives an incoming packet and routes the incoming packet to the port connected to the packet formatter 518 based on the deterministic routing logic. The packet formatter 518 then deencapsulates the response/request from the packet and provides it to either the virtual network controller 514 or the virtual storage controller 516 based on a type-identifier included in the request. The controller receiving the request then processes the response/request and controls the I/O bus interface 512 to signal the request to the northbridge 510, whereupon the response/request is processed as though it were a response or request from a local peripheral resource.

For a transitory packet for which the compute node 500 is an intermediate node in the routing path for the packet, the fabric switch 520 determines the destination address (e.g., the tuple (x,y,z)) from the header of the transitory packet as indicated by the first flit of the packet, and provides each flit of the packet to a corresponding output port based on the deterministic routing logic.

The fabric interface device 506 also includes a checksum module 515 and an error register 517. As each flit of a packet is received, the fabric switch 520 provides it to the checksum module 515 for an error detection operation. In response to receiving the final flit of the packet having the error detection information, the checksum module 515 completes the error detection operation and reports the results by storing a designated value at error register 517. For example, in some embodiments the error register 517 includes a number of fields, with each field corresponding to a different node connected to the compute node 500. In response to completing an error detection operation for a packet, the checksum module 515 stores a designated value indicating whether an error was detected (e.g. a "1" for a detected error and a "0" for no detected error) at the field of the error register 517 corresponding to the connected node from which the packet was received. The value at the error register 517 can be used to identify which node in a routing path is a faulty node, as described above.

In some embodiments, the checksum information for a packet is included only in the final flit. That is, when the packet is generated at the source node, checksum information is generated for the entire packet, and the checksum information is included in the final flit. Accordingly, the error detection operation is performed at each intermediate node in response to receiving the last flit that includes the checksum information. The checksum information thus provides "end-to-end" error detection for the entire packet, rather than error detection information for each individual flit.

In some embodiments, the flits for different packets can be received at a node in interleaved fashion. In these scenarios, each of the different packets is associated with a different virtual channel, and each intermediate node keeps track of the checksum or other error detection information for each virtual channel. In some embodiments, in response to detecting an error, the intermediate node that detected the error can report the virtual channel for which the error was detected, the source and destination addresses of the packet that caused the error detection, the packet type for the packet that caused the error detection, and the like. This information can be used to assist in identifying the source of the error.

As noted above, the BIOS likewise can be a virtualized peripheral resource. In such instances, the fabric interface device 506 can include a BIOS controller 526 connected to the northbridge 510 either through the local I/O interface bus 524 or via a separate low pin count (LPC) bus 528. As with storage and network resources, the BIOS controller 526 can emulate a local BIOS by responding to BIOS requests from the northbridge 510 by forwarding the BIOS requests via the packet formatter 418 and the fabric switch 520 to a peripheral resource node managing a remote BIOS, and then providing the BIOS data supplied in turn to the northbridge 510.

Figure 6:
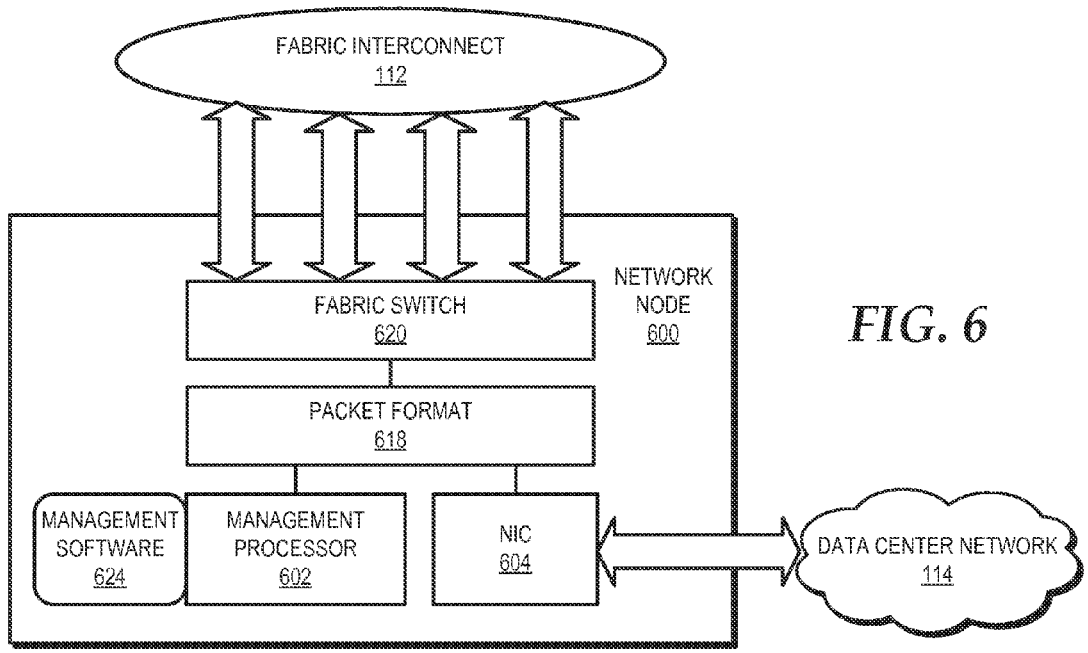
FIG. 6 illustrates a network node implemented in the server of FIG. 1 in accordance with some embodiments.

FIG. 6 illustrates a network node 600 implemented in the server 100 of FIG. 1 in accordance with some embodiments. The network node 600 corresponds to, for example, network nodes 110 and 111 of FIG. 1. In the depicted example, the network node 600 includes a management processor 602, a NIC 604 connected to, for example, an Ethernet network such as the data center network 114, a packet formatter 618, and a fabric switch 620. As with the fabric switch 420 of FIG. 4, the fabric switch 620 operates to switch incoming and outgoing packets among its plurality of ports based on deterministic routing logic. A packetized incoming request intended for the NIC 604 (which is virtualized to appear to the processor 402 of a compute node 400 as a local NIC) is intercepted by the fabric switch 620 from the fabric interconnect 112 and routed to the packet formatter 618, which deincapsulates the packet and forwards the request to the NIC 604. The NIC 604 then performs the one or more operations dictated by the request. Conversely, outgoing messages from the NIC 604 are encapsulated by the packet formatter 618 into one or more packets, and the packet formatter 618 inserts the destination address into the header of the outgoing packets. The outgoing packets are then switched to the port associated with the link in the fabric interconnect 112 connected to the next node in the fixed routing path between the network node 600 and the intended destination node.

The management processor 602 executes management software 624 stored in a local storage device (e.g., firmware ROM or flash memory) to provide various management functions for the server 100. These management functions can include maintaining a centralized master routing table and distributing portions thereof to individual nodes. Further, the management functions can include link aggregation techniques, such implementation of IEEE 802.3ad link aggregation, and media access control (MAC) aggregation and hiding.

Figure 7:
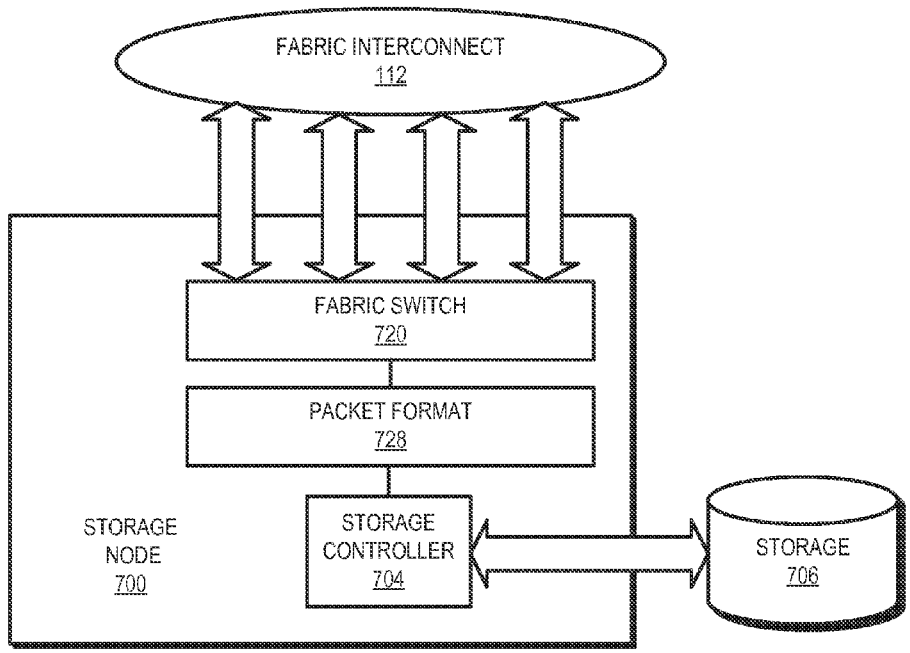
FIG. 7 illustrates a storage node implemented in the server of FIG. 1 in accordance with some embodiments.

FIG. 7 illustrates a storage node 700 implemented in the server 100 of FIG. 1 in accordance with some embodiments. The storage node 700 corresponds to, for example, storage nodes 107-109 of FIG. 1. As illustrated, the storage node 700 is configured similar to the network node 700 of FIG. 7 and includes a fabric switch 720 and a packet formatter 718, which operate in the manner described above with reference to the fabric switch 620 and the packet formatter 618 of the network node 600 of FIG. 6. However, rather than implementing a NIC, the storage node 700 implements a storage device controller 704, such as a SATA controller. A depacketized incoming request is provided to the storage device controller 704, which then performs the operations represented by the request with respect to a mass storage device 706 or other peripheral device (e.g., a USB-based device). Data and other responses from the peripheral device are processed by the storage device controller 704, which then provides a processed response to the packet formatter 718 for packetization and transmission by the fabric switch 720 to the destination node via the fabric interconnect 112.

Figure 8:
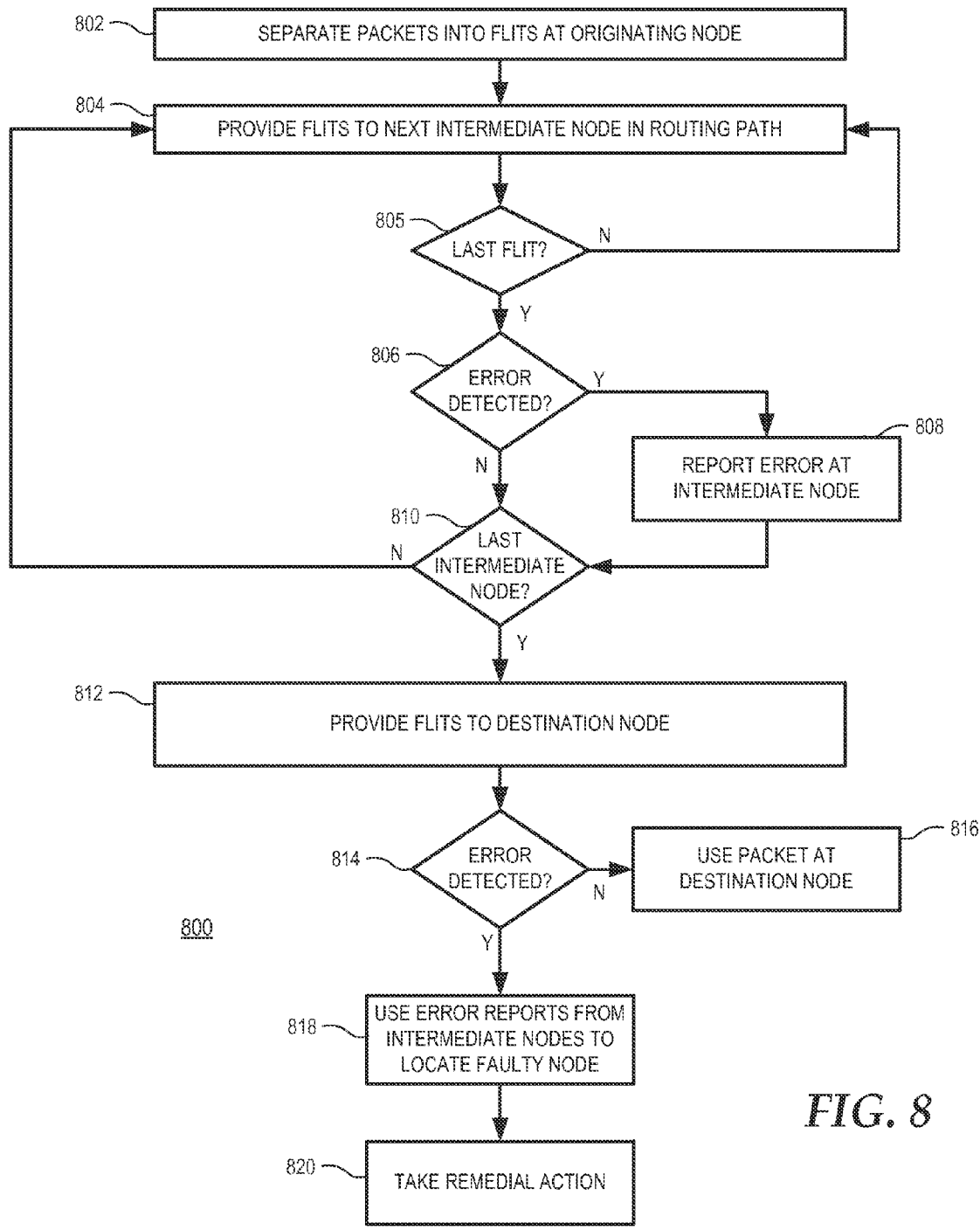
FIG. 8 illustrates a method of performing error detection on a hop-by-hop basis at intermediate nodes of a routing path at a server in accordance with some embodiments.

FIG. 8 illustrates a flow diagram of a method 800 of performing error detection on a hop-by-hop basis at a server system in accordance with some embodiments. For purposes of explanation, the method 800 is described with respect to an example implementation at the server 100 of FIG. 1. At block 802, an originating node prepares to send a packet to a destination node of the server 100 along a routing path. Accordingly, the originating node divides the packet into a set of flits and generates checksum or other error detection information that is appended to the end of the packet in the last flit. At block 804, the originating node serially provides the flits to the next intermediate node in the routing path. At block 805, the intermediate node determines if it has received the last flit for a packet. If not, the method flow returns to block 804. In response to receiving the last packet, the method flow moves to block 806 and the intermediate node performs an error detection operation on the received flits and in response to detecting an error reports the error at block 808. Whether or not an error is detected, at block 810 the server 100 determines if the intermediate node is the final intermediate node in the routing path. If not, the method returns to block 804 and the flits are provided to the next intermediate node in the routing path. Note that, in some embodiments, each intermediate node concurrently provides flits to the next node in the routing path as it performs the error detection operation on received flits. In other words, the intermediate nodes need not wait to receive all the flits of the packet to begin the error detection operation, and need not wait until completion of the error detection operation to communicate received flits to the next node in the routing path.

At block 812 the flits of the packet are provided from the last intermediate node to the destination node. At block 814 the destination node performs an error detection operation on the received flits. In response to the error detection operation indicating no error, the method flow moves to block 816 and the destination node uses the packet. If an error is detected at the destination node, the method flow moves to block 818 and the server 100 determines, based on the error reports, which of the intermediate nodes is the faulty node that caused the error. For example, in some embodiments, a management node of the server 100 requests the error reports from each intermediate node, and determines that the faulty node is the last node along the routing path that did not report an error. The method flow proceeds to block 820 and the server 100 takes remedial action to isolate and correct the faulty node. For example, in some embodiments the server 100 updates the routing rules at each of its compute nodes so that the faulty node is not included in any routing paths and stores an identifier of the faulty node in an error file. The error file can be provided to a service center or otherwise used by a service technician or other user to identify the FRU that includes the faulty node and replace that FRU.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processor described above. Further, in some embodiments, the apparatus and techniques described above are implemented in a system comprising one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 9:
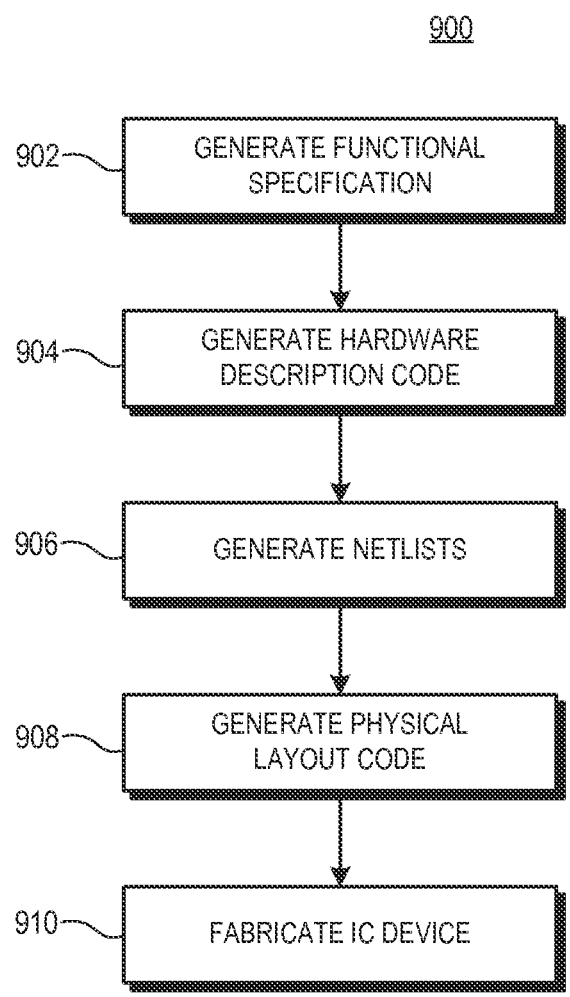
FIG. 9 is a flow diagram illustrating a method for designing and fabricating an integrated circuit (IC) device in accordance with some embodiments.

FIG. 9 is a flow diagram illustrating an example method 900 for the design and fabrication of an IC device implementing one or more aspects. As noted above, the code generated for each of the following processes is stored or otherwise embodied in computer readable storage media for access and use by the corresponding design tool or fabrication tool.

At block 902 a functional specification for the IC device is generated. The functional specification (often referred to as a micro architecture specification (MAS)) may be represented by any of a variety of programming languages or modeling languages, including C, C++, SystemC, Simulink™, or MATLAB™.

At block 904, the functional specification is used to generate hardware description code representative of the hardware of the IC device. In at some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 906 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 908, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 910, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, a server system includes: a network of nodes coupled in a network topology via a routing fabric, wherein: the nodes are to communicate a packet from an originating node to a destination node via a set of intermediate nodes; and each intermediate node of the set of intermediate nodes is to perform error detection on the packet to produce a plurality of error reports. In some aspects the originating node is to separate the packet into a set of flow control digits (flits), and where each intermediate node of the set of intermediate nodes is to initiate error detection in response to receiving a first flit of the set of flits and complete error detection in response to receiving a last flit of the set of flits, the error detection based on error detection information generated based on all of the flits for the packet. In some aspects the server system is to identify a faulty node of the set of intermediate nodes based on the plurality of error reports. In some aspects the set of intermediate nodes form a routing path between the originating node and the destination node and the server system is to identify the faulty node by identifying the faulty node as a last intermediate node in the routing path whose corresponding error report does not indicate an error. In some aspects wherein the server system is to identify the faulty node in response to detecting an error in the packet at the destination node. In some aspects the server system is to change a routing scheme of the routing fabric in response to identifying the faulty node, such that faulty node is not used in the routing scheme as an intermediate node to route packets between originating nodes and destination nodes. In some aspects the network topology comprises a three-dimensional network topology. In some aspects the originating node comprises a compute node that communicates with the routing fabric that virtualizes the routing fabric so that it appears to a processor of the compute node as a network interface device. In some aspects the originating node comprises a compute node that communicates with the routing fabric that virtualizes the routing fabric so that it appears to a processor of the compute node as a storage device.

In some embodiments a server system includes a plurality of field replaceable units (FRUs) each of the plurality of field replaceable units comprising a corresponding node to execute services for the server system; and a routing fabric configured to implement a network topology to route a packet between an originating node and a destination node via a set of intermediate nodes, wherein each of the intermediate nodes of the set of intermediate nodes is to perform error detection on the packet as it is communicated. In some aspects the originating node is to separate the packet into a set of flow control digits (flits), and where each intermediate node of the set of intermediate nodes is to initiate error detection in response to receiving a first flit of the set of flits and complete error detection in response to receiving a last flit of the set of flits. In some aspects the server system is to identify a faulty node of the set of intermediate nodes based on the error detection at each of the intermediate nodes. In some aspects the server system is to identify an FRU corresponding to the faulty node based on the error detection at each of the intermediate nodes. In some aspects the server system includes a first FRU including a network interface to provide the server system with an interface to an external network. In some aspects the server system includes a second FRU including a storage interface to provide the server system with an interface to a storage device. In some aspects the network topology comprises a three-dimensional torus topology.

In some embodiments a method includes communicating a packet from a first node of a server system to a second node of the server system via a set of intermediate nodes coupled to a routing fabric of the server system; and performing error detection on the packet at each of the intermediate nodes. In some aspects the method includes separating the packet into a set of flow control digits (flits) at the first node; and wherein performing error detection on the packet comprises: In some aspects the method includes, at each of the intermediate nodes, initiating error detection in response to receiving a first flit of the set of flits and completing error detection in response to receiving a last flit of the set of flits. In some aspects the method includes generating an error report at each of the intermediate nodes based on the error detection to generate a plurality of error reports; and identifying at the server system a faulty node of the set of intermediate nodes based on the plurality of error reports. In some aspects the set of intermediate nodes form a routing path between the first node and the second node and identifying the faulty node comprises identifying the faulty node as a last intermediate node in the routing path whose corresponding error report does not indicate an error. In some aspects the method includes changing a routing scheme for the server system in response to detecting an error based on the error detection.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A server system comprising:
   a network of nodes coupled in a network topology via a routing fabric, wherein:
      the nodes are to communicate a packet from an originating node to a destination node via a set of intermediate nodes;
      each intermediate node of the set of intermediate nodes is to perform error detection on the packet to produce a plurality of error reports, each of the plurality of error reports corresponding to a different one of the set of intermediate nodes;
      the server system is to identify a faulty node of the set of intermediate nodes based on the plurality of error reports; and
      the set of intermediate nodes form a routing path between the originating node and the destination node and the server system is to identify the faulty node by identifying the faulty node as a last intermediate node in the routing path whose corresponding error report does not indicate an error.

2. The server system of claim 1, wherein the originating node is to separate the packet into a set of flow control digits (flits), and where each intermediate node of the set of intermediate nodes is to initiate error detection in response to receiving a first flit of the set of flits and complete error detection in response to receiving a last flit of the set of flits, the error detection based on error detection information generated based on all of the flits for the packet.

3. The server system of claim 1, wherein the server system is to identify the faulty node in response to detecting an error in the packet at the destination node.

4. The server system of claim 1, wherein the server system is to change a routing scheme of the routing fabric in response to identifying the faulty node, such that faulty node is not used in the routing scheme as an intermediate node to route packets between originating nodes and destination nodes.

5. The server system of claim 1, wherein the network topology comprises a three-dimensional network topology.

6. The server system of claim 1, wherein the originating node comprises a compute node that communicates with the routing fabric that virtualizes the routing fabric so that it appears to a processor of the compute node as a network interface device.

7. The server system of claim 1, wherein the originating node comprises a compute node that communicates with the routing fabric that virtualizes the routing fabric so that it appears to a processor of the compute node as a storage device.

8. A method, comprising:
   communicating a packet from a first node of a server system to a second node of the server system via a set of intermediate nodes coupled to a routing fabric of the server system;
   performing error detection on the packet at each of the set of intermediate nodes to generate a plurality of error reports, each of the plurality of error reports corresponding to a different one of the set of intermediate nodes; and
   identifying at the server system a faulty node of the set of intermediate nodes based on the plurality of error reports;
   wherein the set of intermediate nodes form a routing path between the first node and the second node and identifying the faulty node corn rises identifying the faulty node as a last intermediate node in the routing path whose corresponding error report does not indicate an error.

9. The method of claim 8, further comprising:
   separating the packet into a set of flow control digits (flits) at the first node; and
   wherein performing error detection on the packet comprises:
   at each of the intermediate nodes, initiating error detection in response to receiving a first flit of the set of flits and completing error detection in response to receiving a last flit of the set of flits.

10. The method of claim 8, further comprising changing a routing scheme for the server system in response to detecting an error based on the error detection.

* * * * *